United States Patent

Hino et al.

[11] Patent Number: 5,821,004
[45] Date of Patent: Oct. 13, 1998

[54] MAGNETO-OPTICAL RECORDING MEDIUM AND RECORDING AND READING OUT PROCESS USING THE SAME

[75] Inventors: Yasumori Hino, Osaka; Yoshihiko Kudoh, Yawata; Masahiro Birukawa, Osaka; Norio Miyatake, Kobe, all of Japan

[73] Assignee: Matsushita Electric Industrial Co., Ltd, Osaka-fu, Japan

[21] Appl. No.: 983,128

[22] Filed: Nov. 30, 1992

[30] Foreign Application Priority Data

Nov. 29, 1991 [JP] Japan .................................. 3-316510

[51] Int. Cl.$^6$ ........................................................ G11B 5/66
[52] U.S. Cl. .................... 428/694 ML; 428/694 RE; 428/694 MM; 428/694 EC; 428/900; 369/13; 365/122
[58] Field of Search .......................... 428/900, 694 MM, 428/694 RE, 694 ML, 694 EC; 369/13; 365/122

[56] References Cited

U.S. PATENT DOCUMENTS

| | | | |
|---|---|---|---|
| 5,132,945 | 7/1992 | Osato et al. | 369/13 |
| 5,278,810 | 1/1994 | Takahashi et al. | 369/13 |

FOREIGN PATENT DOCUMENTS

| | | |
|---|---|---|
| 107344 | 4/1989 | Japan . |
| 393056 | 4/1991 | Japan . |
| 393058 | 4/1991 | Japan . |
| 3242845 | 10/1991 | Japan . |

*Primary Examiner*—Leszek Kiliman
*Attorney, Agent, or Firm*—Wenderoth, Lind & Ponack

[57] ABSTRACT

A magneto-optical recording medium having a recording layer which has a first magnetic film, a second magnetic film and a third magnetic film in this order from a laser beam incident side, in which the second magnetic film has a perpendicular anisotropy in a temperature range from room temperature to a Curie temperature, the first magnetic film has an in-plane anisotropy when there is no temperature increase by the irradiation of a laser beam or a perpendicular anisotropy when the temperature is raised by the irradiation of the laser beam, and an exchange coupled force is present between the first magnetic film and the second magnetic film.

9 Claims, 14 Drawing Sheets

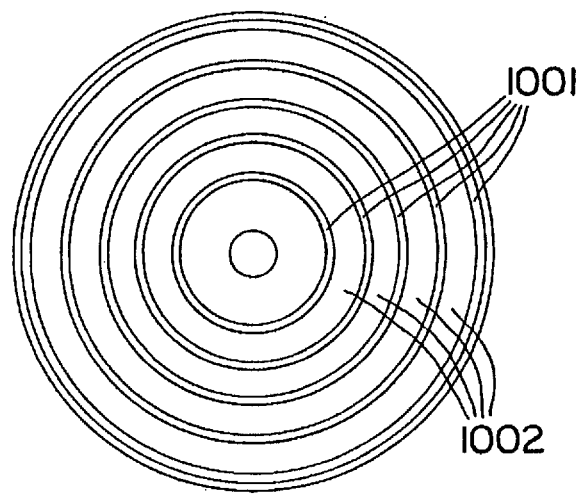
F I G. 10
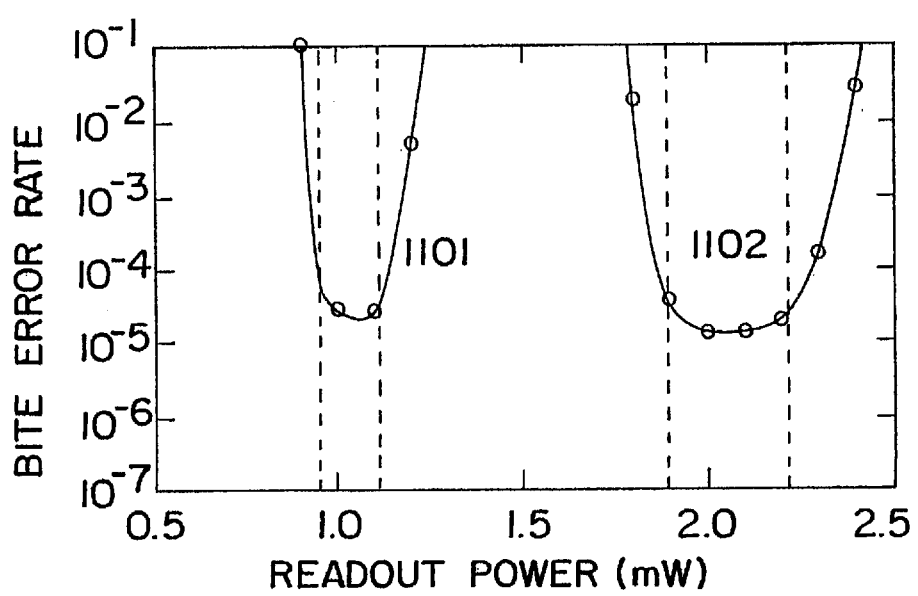
F I G. 11

MAGNETO-OPTICAL RECORDING MEDIUM AND RECORDING AND READING OUT PROCESS USING THE SAME

BACKGROUND OF THE INVENTION

1. Field of the Invention

The present invention relates to a magneto-optical recording medium and a recording and reading out process using the same. More particularly, the present invention relates to a magneto-optical recording medium which records or erases signals through temperature increase caused by the irradiation of a laser beam and reads out the signals utilizing a magneto-optical effect.

2. Description of the Related Art

In general, signals are recorded on a magneto-optical recording medium by the following process. First, a part of a recording layer is heated by irradiating a laser beam. The heating temperature is a temperature higher than a compensation temperature at which a coercive force is small, or a temperature higher than a Curie temperature. Then, the heated part of the recording layer is magnetized in a direction of an external magnetic field, and the recording medium is cooled and simultaneously the magnetization is fixed. This is so-called a thermo-magnetical recording.

The recorded signals are read out by detecting a rotational state of a polarization plane by the use of the magneto-optical effect. That is, when a linear polarization laser beam having an intensity lower than that of the laser beam used for recording or erasing the signals is irradiated on the magneto-optical recording medium, the polarization plane of a reflection beam or a transmission beam rotates in a reverse direction depending on the recording state of the recording layer (namely, the direction of magnetization). Using this phenomenon, the rotation state of the polarization plane is detected.

The conventional recording systems include a magnetic field modulation recording system and a light power modulation recording system. In the magnetic field modulation system, the laser beam having a specific intensity is irradiated on the magneto-optical recording medium to raise the temperature of the recording layer and simultaneously the direction of the magnetic field is modulated according to the recording signals, whereby the signals are thermo-magnetically recorded. In the light power modulation system, in the external magnetic field having a specific strength, a laser beam having an intensity which is modulated according to the recording signals is irradiated on the magneto-optical recording medium to raise a temperature of a part of the recording layer, whereby the signals are thermo-magnetically recorded.

With such conventional magneto-optical recording medium, when a recorded mark having an area smaller than a laser beam spot diameter is formed and read out, the following problems may arise. One of them is that, when the area of the recorded mark is smaller than the diameter of the readout laser beam spot, the readout signal is made smaller by interferences from previous and subsequent recorded marks, so that a S/N ratio is decreased and then high density recording is not achieved. Another problem is that when a distance between adjacent recording tracks is made smaller than the diameter of the readout laser beam spot, a level of cross-talk from the neighboring recording tracks increases, so that jitter increases during reading out, whereby increase of the capacity is prevented.

To solve the above problems, a process for reading out small recorded marks having an area smaller than the diameter of the laser beam spot is proposed in Journal of Magnetics Society of Japan, Vol. 15, Supplement, No. S1, pages 319–322 (Apr. 16–18, 1991). In this process, a recording layer and a readout layer are separately formed, and recorded signals are read out while a state in which the signals are copied to the readout layer from the recording layer is formed within a small limited area in a region which is irradiated by the laser beam.

To realize such readout process, a front aperture detection (FAD) system and a rear aperture detection (RAD) system are known.

In the FAD system, a switching layer having a low Curie temperature is provided between the recording layer and the readout layer and all three layers are formed by perpendicular anisotropy magnetic films, so that exchange coupled force is present between each pair of the magnetic layers at room temperature. Now, a readout principle of the magneto-optical recording medium having such structure is explained briefly. At room temperature, by the exchange coupled effects, the recorded mark is copied from the recording layer to the readout layer through the switching layer. However, in the region at which the readout laser beam is irradiated to heat the switching layer to a temperature higher than the Curie temperature, magnetization of the switching layer disappears, and as the result, no exchange coupling functions between the recording layer and the readout layer. Accordingly, the direction of the magnetization of the readout layer having the small coercive force is aligned in the same direction as that of a small magnetic field which is applied during reading out. Then, while no signal is generated from the part heated by the readout laser beam irradiation, the signal is obtained from the part which is not heated by the readout layer beam irradiation in the irradiated region.

The FAD system can suppress decrease of the S/N ratio caused by the increase of the recording density, since the readout signal becomes small due to the interference from the previous and subsequent recorded marks when the area of the recorded mark is smaller than the spot diameter of the laser beam. That is, in a tangential direction of the magneto-optical recording medium, high density recording is achieved. But, in this system, since the signal is read out in the part where the temperature increase is small in the region which is irradiated by the readout layer beam, when the distance between the adjacent recording tracks is made smaller than the diameter of the readout layer beam spot, the level of the cross-talk from the neighboring tracks increases. Thereby, it is impossible to increase the capacity by narrowing a track pitch.

In the PAD system, a magneto-optical recording medium comprises two perpendicular anisotropy magnetic layers, namely a recording layer having a high coercive force and a readout layer having a low coercive force, and the exchange coupled force is present between the magnetic layers. Now, a readout principle of the magneto-optical recording medium having such structure is explained briefly. At room temperature, the magnetization of the readout layer only is aligned in one direction. When the readout layer beam is irradiated on the specific region of the readout layer and the temperature of the irradiated part is raised, the coercive force in this part is quickly decreased so that the recorded mark on the recording layer is copied to the readout layer by the exchange coupled effect. Then, the signal is generated only from the part which is heated by the readout laser beam irradiation, while no signal is generated from the part which is not heated in the irradiated region.

The PAD system can suppress decrease of the S/N ratio caused by the increase of the recording density, since the readout signal becomes small due to the interference from the previous and subsequent recorded marks when the area of the recorded mark is smaller than the spot diameter of the laser beam. That is, as in the FAD system, in a tangential direction of the magneto-optical recording medium, high density recording is achieved. In addition, since the signal is read out from the part in which the temperature increase is large in the region at which the readout laser beam is irradiated, the level of cross talk from the neighboring tracks does not increase when the distance between the adjacent recording tracks is made smaller than the diameter of the readout laser beam spot. Therefore, the capacity can be increased by narrowing the track pitch.

However, the magnetization of the readout layer should be aligned in one direction at room temperature. To achieve this alignment of the magnetization, an external magnetic field having a strength larger than a sum of the coercive force and the exchange coupled force is required. Therefore, it is necessary to provide, in addition to a magnetic field generating apparatus for erasing the recorded signals, a large scale apparatus for applying an external magnetic field which can apply a magnetic field of about 3 Koe or larger which is about 10 times or more that of the magnetic field generating apparatus for erasing the recorded signals.

SUMMARY OF THE INVENTION

An object of the present invention is to provide a magneto-optical recording medium which requires no means for applying an external magnetic field or only a small apparatus for applying the external magnetic field which has the same size as an apparatus for generating the magnetic field for recording and erasing the signals.

Another object of the present invention is to provide a magneto-optical recording medium which can decrease the interference from the previous and subsequent recorded marks and cross-talk from the neighboring tracks and achieve the recording and reading out with a large capacity at a high transfer rate.

According to the present invention, there is provided a magneto-optical recording medium comprising
(a) a recording layer which comprises a first magnetic film and a second magnetic film in this order from a laser beam incident side, wherein
(b) said second magnetic film has a perpendicular anisotropy in a temperature range from room temperature to a Curie temperature,
(c) said first magnetic film has an in-plane anisotropy when there is no temperature increase by the irradiation of a laser beam or a perpendicular anisotropy when the temperature is raised by the irradiation of the laser beam, and
(d) an exchange coupled force is present between said first magnetic film and said second magnetic film.

BRIEF DESCRIPTION OF THE DRAWINGS

FIG. 10 is a plan view of the magneto-optical recording medium of Example 6, FIG. 11 is a graph showing dependency of the bite error rate on the readout power.

DETAILED DESCRIPTION OF THE INVENTION

Among the structures of the magneto-optical recording medium of the present invention, the characteristics (c) of the first magnetic film are important and different from the conventional magneto-optical recording media.

Now, a readout mechanism of the magneto-optical recording medium of the present invention is explained.

The signals are recorded in the same manner as in the conventional magneto-optical recording media and stored in the second magnetic film. At room temperature, the first magnetic film is the in-plane anisotropy magnetic film. Since a Kerr rotation angle in this state is very small, no or little readout signal is generated. However, when the readout laser beam is irradiated and an irradiated part of the first magnetic film is heated, such part of the first magnetic film becomes the perpendicular anisotropy magnetic film, and then the recorded mark is copied from the second magnetic film to the first magnetic film by the exchange coupled effect. Accordingly, the signal is generated from the part which is heated by the irradiation of the readout laser beam, while no signal is generated from a part which is not heated, in the region which is irradiated by the readout laser beam.

Examples of a magnetic material which forms an in-plane anisotropy magnetic film at room temperature and is changed to a vertical magnetic film at a temperature elevated by the readout laser beam irradiation are alloys of a rare earth metal and a transition metal containing the rare earth metal in an amount larger than a compensation composition at room temperature. Preferably, such alloy comprises at least one rare earth metal (e.g. Gd, Tb, Dy, Ho, etc.) and at least one transition metal (e.g. Fe, Co, etc.).

Figure 20:
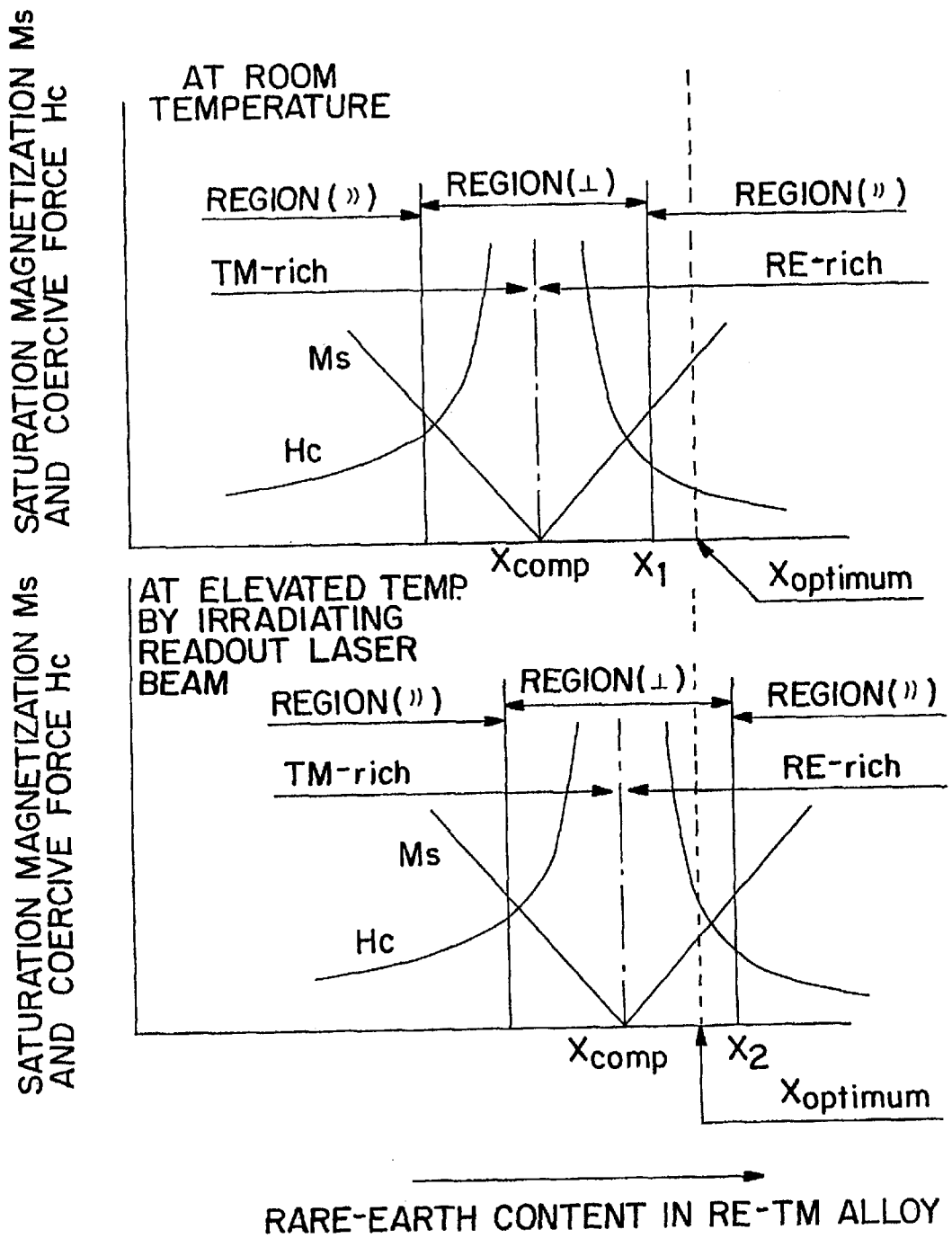

In general, the rare earth metal/transition metal alloy is a ferrimagnetic material. As shown in FIG. 20, its apparent saturation magnetization Ms is zero (0) at the compensation composition Xcomp at which the magnetization of the rare earth metal and that of the transition metal are balanced. At a composition in which the amount of the rare earth metal is smaller than that in the compensation composition Xcomp, the alloy becomes transition metal rich (TM-rich) magnetically, while at a composition in which the amount of the rare earth metal is larger than that in the compensation composition, the alloy becomes rare earth metal rich (RE-rich). In either side of TM-rich and RE-rich, the saturation magnetization Ms increases as the composition deviates from the compensation composition Xcomp.

By the way, to make magnetic anisotropy of the magnetic film perpendicular to the film plane, a perpendicular anisotropy magnetic anisotropy energy Ku and the saturation magnetization Ms should satisfy the following equation:

$$2\pi(Ms)^2 < Ku.$$

In the case of the rare earth metal/transition metal alloy, as seen from FIG. 20, the perpendicular anisotropy magnetic film is obtained in the region (⊥) near the compensation composition in which the Ms is small, while in other regions, the in-plane anisotropy magnetic film is obtained.

However, a temperature dependency of the magnetic characteristics of the rare earth metal and that of the transition metal are not the same. Therefore, the compensation composition Xcomp shifts as the temperature changes. With the rare earth metal/transition metal alloy, as the temperature increases, the compensation composition Xcomp shifts to a rare earth metal rich composition. That is, as the temperature increases, the Ms curve shifts from the upper graph of FIG. 20 to the lower graph of FIG. 20. Correspondingly, the region (⊥) in which the perpendicular anisotropy magnetic film is obtained shifts to the rare earth metal rich composition side as the temperature increases.

Accordingly, an alloy having a composition Xoptimum (see FIG. 20) can be a magnetic material which provides the in-plane anisotropy magnetic film at room temperature and the perpendicular anisotropy magnetic film at the elevated temperature. An acceptable range of the composition is from $X_1$ (lower limit) which is a boundary between the region (⊥) and the region (//) at room temperature (in the upper graph of FIG. 20) to $X_2$ (upper limit) which is a boundary between the region (⊥) and the region (//) at the elevated temperature under the irradiation of the readout laser beam. In this range, the magnetic film is the in-plane anisotropy magnetic one at room temperature and the perpendicular anisotropy magnetic one at the elevated temperature.

To provide such alloy, at least one rare earth metal selected from the group consisting of Gd, Tb, Dy and Ho is preferably used. To increase a margin of the readout power, it is desirable to set the Curie temperature at 200° C. or higher. To this end, among the rare earth metals, Gd and Tb are preferred.

To provide the above alloy, at least one transition metal selected from the group consisting of Fe and Co is preferably used. In particular, a FeCo alloy is preferred since a perpendicular anisotropy magnetic anisotropy energy can be adjusted according to its composition.

Examples of the alloys are an alloy of 26% (atomic %) of Gd, 38% of Fe and 36% of Co, and an alloy of 29% of Tb and 71% of Fe.

The above explanation does not limit the scope of the present invention. Other magnetic material which provides the in-plane anisotropy magnetic film at room temperature and the perpendicular anisotropy magnetic film at the elevated temperature caused by the irradiation of the readout laser beam may be used.

The magneto-optical recording medium of the present invention may be produced by any of the conventional methods for producing the conventional magneto-optical recording media. For example, on a substrate, the first and second magnetic layers are formed by conventional sputtering or evaporating methods, and these magnetic films may be sandwiched by protective layers which are also formed by sputtering or evaporating.

Examples of the substrate are plastics such as polycarbonate or polymethyl methacrylate, glass or glass coated with a photopolymer, and the like. In the present invention, any kind of the substrates which are conventionally used in the conventional optical disc can be used. Among them, polycarbonate is preferred since it can be injection molded easily.

A thickness of the first magnetic film is generally from 30 to 100 nm, preferably from 40 to 70 nm, and a thickness of the second magnetic film is generally from 30 to 70 nm, preferably from 40 to 70 nm. When the thickness of the first magnetic film is too small, the informations of the first and second magnetic films are mixed in the readout step so that the effects of-the present invention are not obtained. To completely copy the data from the second magnetic film to the first magnetic film in the readout step, the thickness of the first magnetic film is preferably two thirds or more of that of the second magnetic film. When the thickness of the first magnetic film is too large, the total thickness of the magnetic films becomes too large so that the recording sensitivity decreases.

A protective layer may be provided to sandwich the first and/or second films. The protective layer may be made of SiN, AlN, ZnS, SiON, AlON, $ZnS.SiO_2$, $Ta_2O_5$, etc. In the present invention, any kind of the protective layers which are conventionally used for the optical disc can be used. In particular, a thickness of the protective layer is in general from 70 to 200 nm because of increase of the Kerr rotation angle. The thickness of the protection layer opposite to the substrate is in general from 100 to 200 nm.

In the magneto-optical recording medium of the present invention, the first magnetic film returns to the in-plane anisotropy magnetic film by spontaneous cooling after the readout laser beam leaves the irradiating region.

The present invention will be explained further in detail by making reference to the accompanying drawings.

PREFERRED EMBODIMENTS OF THE INVENTION

EXAMPLE 1

Figure 1A:
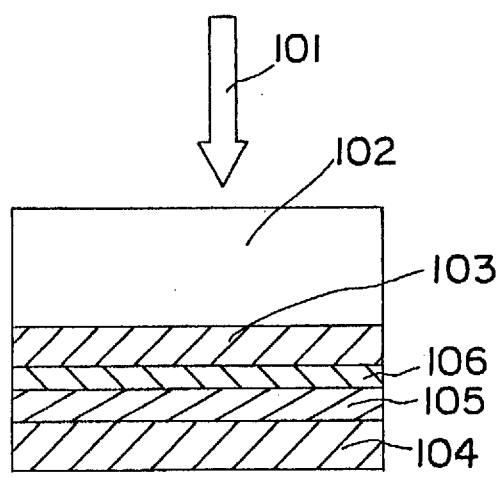
FIG. 1A schematically shows a cross sectional view of the magneto-optical recording medium of Example 1.
Figure 1B:
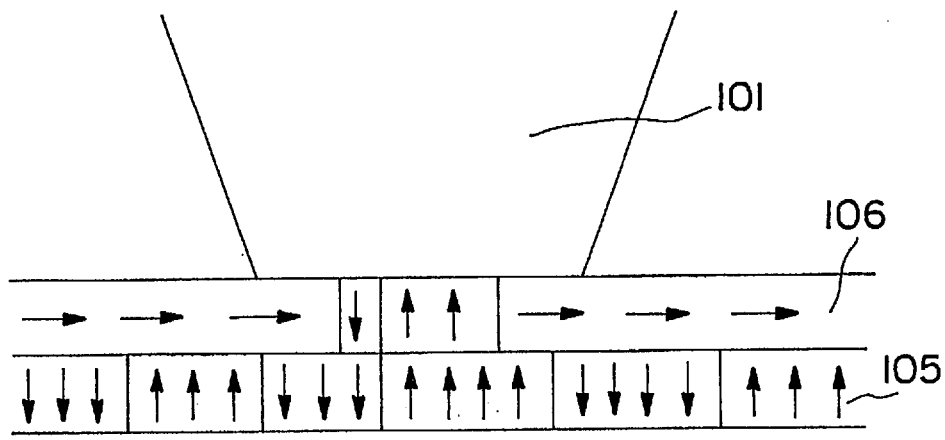
FIGS. 1B and 1C are a cross sectional view and a plan view of the magneto-optical recording medium of Example 1, respectively, for explaining the readout principle.
Figure 1C:
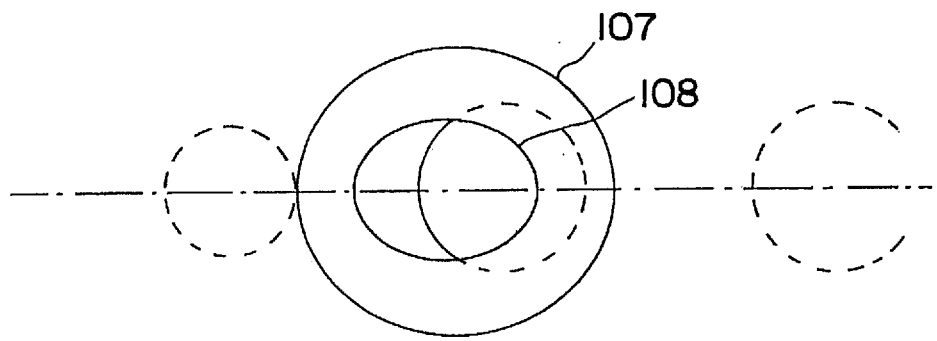

Now, a first embodiment of the magneto-optical recording medium of the present invention is illustrated by making reference to FIGS. 1A to 1C.

FIG. 1A schematically shows a cross sectional view of an example of the magneto-optical recording medium of the present invention, and FIGS. 1B and 1C are a cross sectional view and a plan view, respectively and explain the readout principle of the magneto-optical recording medium of FIG. 1A. In FIG. 1A, 101 stands for a readout laser beam, 102 for a substrate, 103 and 104 for protective layers, 105 for a second magnetic film consisting of a TbFeCo alloy film, and 106 for a first magnetic film consisting of a GdFeCo alloy film.

The provision of the first magnetic film 106 is a novel feature of the present invention, while other constructions are substantially the same as those in the conventional magneto-optical recording media.

In the embodiment of FIG. 1, the thicknesses of the films or layers were as follows:

Second magnetic film 105: 50 nm

First magnetic film 106: 70 nm

Protective layer 103: 80 nm

Protective layer 104: 100 nm

The composition of TbFeCo alloy of the second layer 105 was 22.5% of Tb, 69% of Fe and 8.5% of Co, which is the same as a composition of a conventional magneto-optical film. The composition of the GdFeCo alloy of the first magnetic film 106 was 26% of Gd, 38% of Fe and 36% of Co so that the first film was the in-plane anisotropy magnetic film at room temperature and the perpendicular anisotropy magnetic film at the elevated temperature caused by the irradiation of the readout laser beam.

Figure 2:
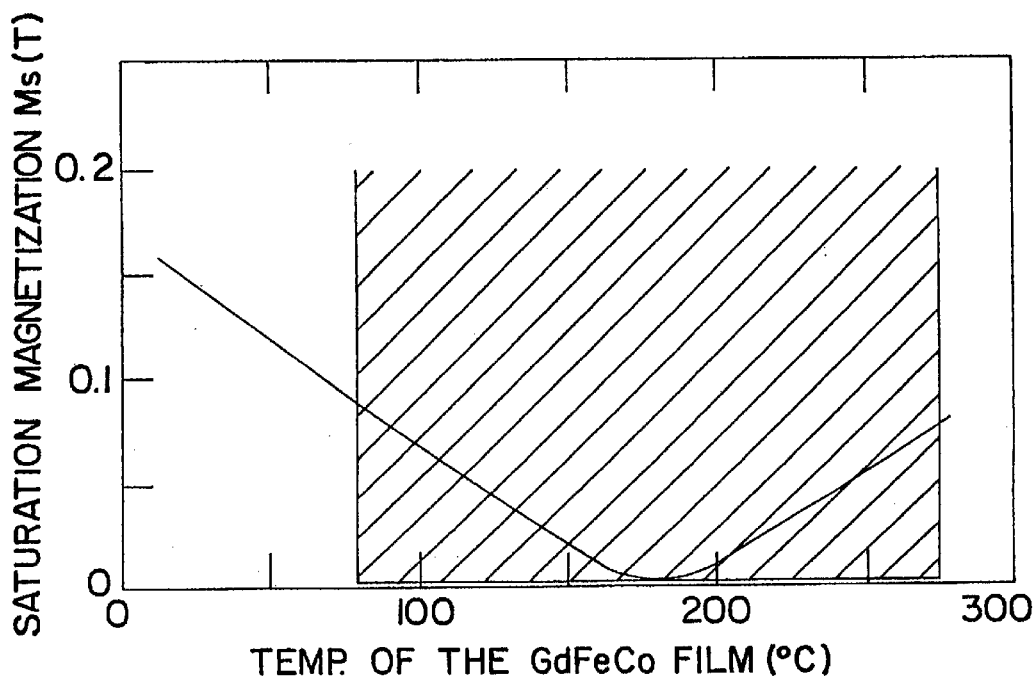
FIG. 2 is a graph showing dependency of the saturation magnetization of the first magnetic layer of the magneto-optical recording medium of Example 1 on the temperature.

A dependency of the saturation magnetization of the first magnetic film 106 on the temperature is shown in FIG. 2. In this first embodiment, the compensation temperature was 180° C., and the Curie temperature was 350° C. or higher.

In the hatched area of FIG. 2, the GdFeCo film was the perpendicular anisotropy magnetic film at zero of the external magnetic field. As shown in FIG. 2, the GdFeCo film of this first embodiment was the perpendicular anisotropy magnetic film at a temperature of 80° C. or higher. The temperature or temperature range at which the GdFeCo film exhibits the perpendicular anisotropy magnetic film can be easily shifted by changing the composition of the GdFeCo alloy. Therefore, when conditions for the readout of the magneto-optical recording medium such as a linear velocity are changed, a suitable magneto-optical recording medium can be produced by changing the composition of Gd, Fe and Co in the first magnetic film. Alternatively, it is possible to optimize the readout conditions by changing the readout power according to the linear velocity.

Now, the readout principle is explained by making reference to FIGS. 1B and 1C.

On the second magnetic layer 105, recorded marks are formed by a conventional recording system.

When the recorded mark is read out at a comparatively low linear velocity of, for example, 4 m/sec. or less, a temperature is maximum near the center of the region 107 which is being irradiated by the readout laser beam 101. Towards the periphery of the region 107, the temperature decreases.

As shown in FIG. 1C, in a part 108 in which the temperature is 80° C. or higher, the first magnetic film 106 is converted to the perpendicular anisotropy magnetic film as shown in FIG. 1B, whereby the recorded mark on the second magnetic film 105 is copied to the first magnetic film 106 by the exchange coupled effect. Hereinafter, the part 108 is referred to as a "copying part". In the peripheral part in which the temperature is lower than 80° C., the first magnetic film 106 remains in the in-plane anisotropy magnetic film state. Since the signal from the in-plane anisotropy magnetic film in the readout step is negligibly small, only the signal from the center copying part 108 of high temperature is detected. Since an area of the copying part 108 can be made much smaller than the diameter of the laser beam spot, it is possible to read out the signal recorded at the high density.

Since the GdFeCo alloy has a very high Curie temperature of about 350° C. or higher, the Kerr rotation angle is large in the readout step and a high S/N ratio is achieved. As an criterion for a signal amount, R$\theta$k is usually used, in which R is a reflectance of a material and $\theta$k is a Kerr rotation angle. With the conventionally used alloy of $Tb_{22.5}Fe_{69}Co_{8.5}$, R$\theta$k is about 0.15, while R$\theta$k of the GdFeCo alloy used in this Example is 0.19.

Figure 3:
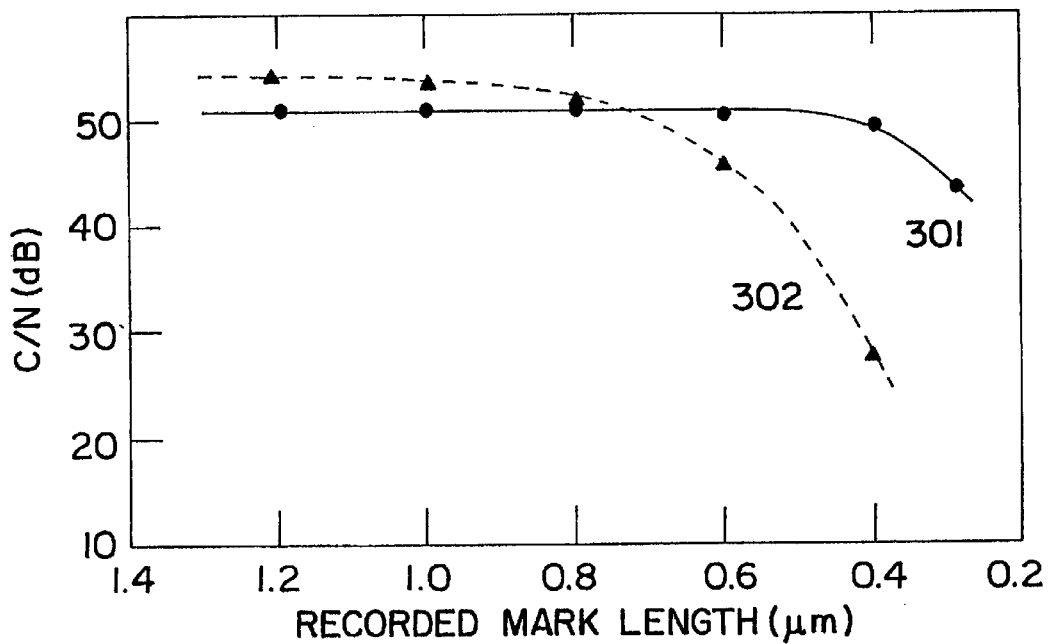
FIG. 3 is a graph showing a relationship between the C/N and the recorded mark length in Example 1.

FIG. 3 shows the measured results of the dependency of the readout signal ratio (C/N) on the recorded mark length of the above magneto-optical recording medium. This measurement was carried out by the light power modulation recording system using a laser beam having a wavelength of 780 nm and a full width of half maximum (FWHM) of 0.78 $\mu$m and an objective lens having a NA of 0.55. A velocity of the magneto-optical recording medium was 4 m/sec., and no external magnetic field was applied irrespective of whether or not the laser beam being irradiated.

In FIG. 3, the solid line 301 represents the relationship between the C/N and the recorded mark length of the magneto-optical recording medium of the present invention. For comparison, the dotted line 302 represents the relationship of the C/N and the recorded mark length of the conventional magneto-optical recording medium. The used conventional magneto-optical recording medium had the same construction as that of this Example except that the first magnetic film was made of the same material as the second magnetic film. That is, the substrate and two protective layers were the same as those of this Example while the single magneto-optical layer was made of $Tb_{22.5}Fe_{68}Co_{9.5}$ and had a thickness of 120 nm.

As seen from FIG. 3, in the range in which the recorded mark length was shorter than the FWHM of the laser beam spot, the C/N of the magneto-optical recording medium of the present invention was larger than that of the conventional magneto-optical recording medium. This means that the magneto-optical recording medium of the present invention is suitable for high density recording.

In the magneto-optical recording medium of the present invention, no cross-talk was recognized at the track pitch of 1.4 $\mu$m. The cross-talk amount was decreased by about 23 dB or more in comparison with the conventional magneto-optical recording medium. This means that the present invention realizes the magneto-optical recording medium having the narrow track pitch.

As explained above, the magneto-optical recording medium of the present invention achieves both the increase of the S/N ratio and the decrease of the cross-talk with the short recorded mark length which is shorter than the FWHM of the laser beam spot in the absence of the external magnetic field. Therefore, the present invention can provide a high capacity magneto-optical recording medium with a high transfer rate.

EXAMPLE 2

Figure 4A:
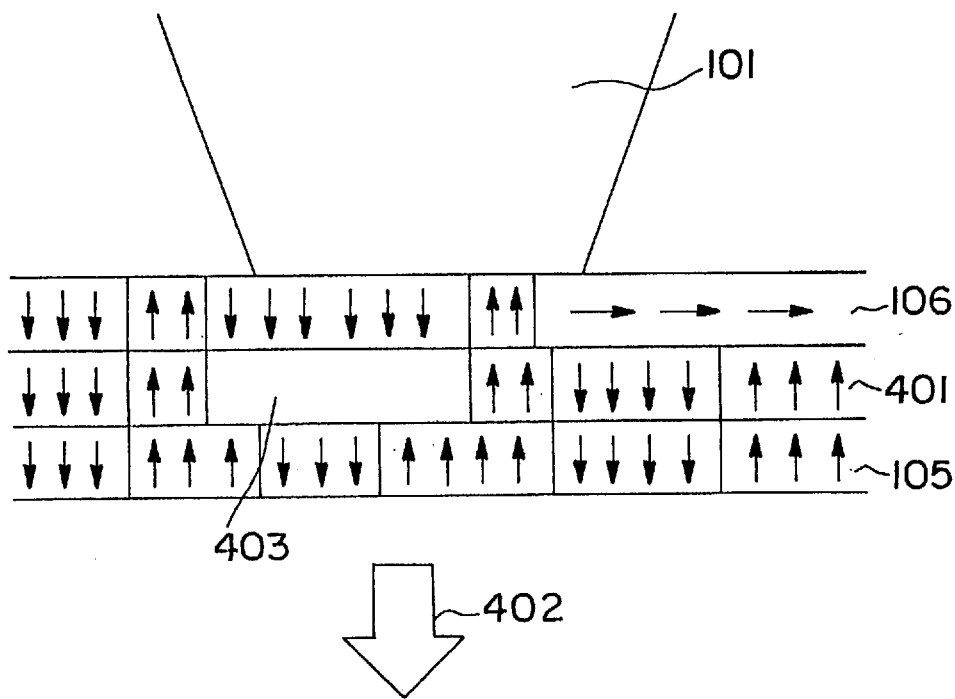
FIGS. 4A and 4B are a cross sectional view and a plan view of the magneto-optical recording medium of Example 2, respectively, for explaining the readout principle.
Figure 4B:
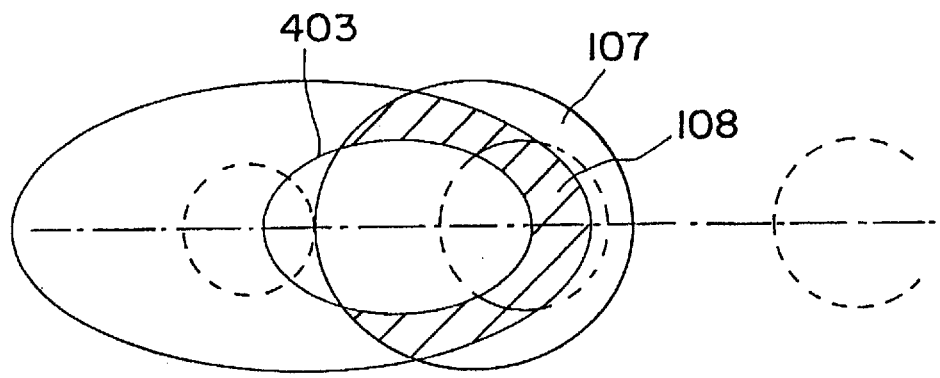

A second embodiment of the magneto-optical recording medium of the present invention will be illustrated by making reference to FIGS. 4A and 4B, which are a cross sectional view and a plan view of this embodiment, respectively.

In FIG. 4A, 101, 105 and 106 are the same as those in FIG. 1A, 401 stands for a third film consisting of the TbFeCo alloy film, and 402 for a small magnetic field of 400 Oe or less which is applied in the readout step.

Though the protective layers were formed on both sides of the laminated three magnetic films, they are not shown in FIG. 4A since their structures are the same as those used in the conventional magneto-optical recording medium.

In the embodiment of FIG. 4, the thicknesses of the films were as follows:

Second magnetic film 105: 50 nm
First magnetic film 106: 70 nm
Third magnetic film 401: 20 nm The first and second magnetic films 106 and 105 were the same as those in the first embodiment of FIG. 1. The composition of the alloy of the third magnetic film was 22% of Tb, 72% of Fe and 6% of Co. This alloy had the Curie temperature of 150° C.

Now, the readout principle is explained by making reference to FIGS. 4A and 4B.

On the second magnetic layer 105, recorded marks are formed by a conventional recording system.

When the recorded mark is read out at a comparatively high linear velocity of, for example, 6 m/sec. or larger, a temperature is maximum at the part behind the center of the laser beam. Towards the periphery of the region, the temperature decreases. Then, as shown in FIG. 4A, in the area which is heated to 150° C. or higher by the laser beam irradiation, the magnetization of the third magnetic film 401 disappears, so that no exchange coupled force is present between the second magnetic film 105 and the first magnetic film 106. Since no exchange coupled force acts on a part of the first magnetic film 106 which faces the area 403 having no magnetization, this part of the first magnetic film 106 is magnetized in the same direction as that of the weak external magnetic field 402. In the area 108 which is heated to a temperature from 80° C. to 150° C. by the laser beam irradiation, the recorded mark in the second magnetic film 105 is copied to the the third magnetic film 401 and then to the first magnetic film 106. On the other hand, in the region in which the temperature is lower than 80° C., the recorded mark on the second magnetic film 105 is copied to the third magnetic film 401. But, since the first magnetic film 106 is in the in-plane anisotropy magnetic film state, the recorded mark is not copied to the first magnetic film 106.

Though the copied area 108 is in the ring form as seen from FIG. 4B, a part which contributes to the readout signal is a hatched part which is present in a front area of the region irradiated by the laser beam. An area of the hatched part which contributes to the readout signal can be made much smaller than the diameter of the laser beam spot, the signal recorded at a high density can be read out.

Figure 5:
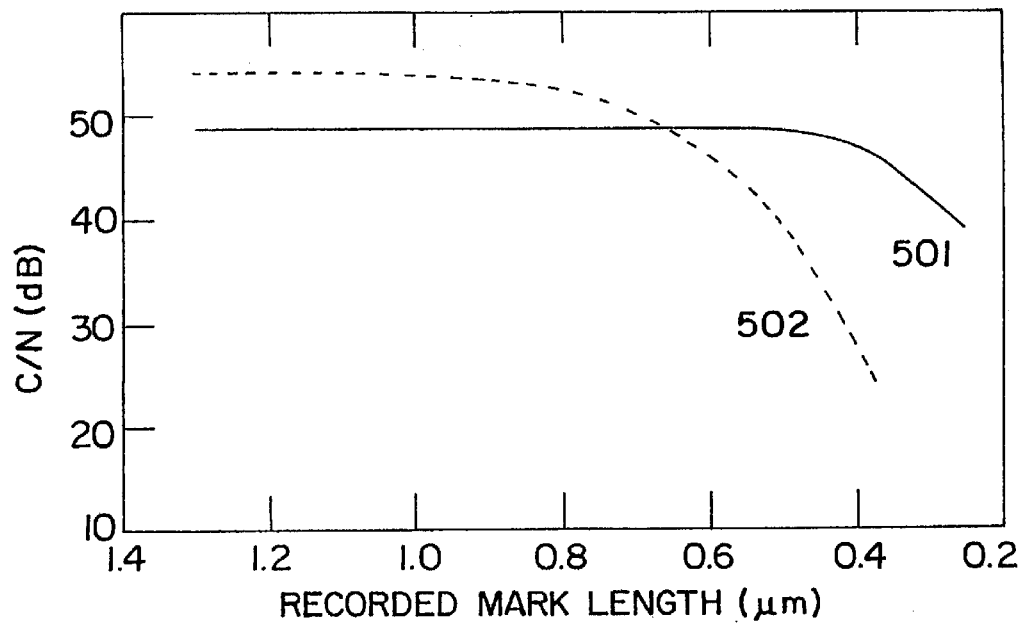
FIG. 5 is a graph showing a relationship between the C/N and the recorded mark length in Example 2.

FIG. 5 shows the measured results of the dependency of the readout signal to noise ratio (C/N) on the recording mark length of the above magneto-optical recording medium. The measuring conditions were substantially the same as those in Example 1 except that a magnetic field of 400 oe was applied in the readout step and the linear velocity was 8 m/sec.

In FIG. 5, the solid line 501 represents the relationship between the C/N and the recorded mark length of the magneto-optical recording medium of the present invention. For comparison, the dotted line 502 represents the relationship between the C/N and the recorded mark length of the conventional magneto-optical recording medium which was the same as used in Example 1.

As seen from FIG. 5, in the range in which the recorded mark length was shorter than the FWHM of the laser beam spot, the C/N of the magneto-optical recording medium of the present invention was larger than that of the conventional magneto-optical recording medium. This means that the magneto-optical recording medium of the present invention is suitable for high density recording.

In the magneto-optical recording medium of the present invention, no cross talk was recognized at the track pitch of 1.4 µm. The cross talk amount was decreased by about 23 dB or more in comparison with the conventional magneto-optical recording medium. This means that the present invention realizes the magneto-optical recording medium having the narrow track pitch.

As explained above, the magneto-optical recording medium of the present invention achieves both the increase of the S/N ratio and the decrease of the cross talk with the short recorded mark length which is shorter than the FWHM of the laser beam spot in the absence of the large external magnetic field of, for example, 3 Koe. Therefore, the present invention can provide a high capacity magneto-optical recording medium with a high transfer rate.

EXAMPLE 3

In this Example, the recording and reading out experiments were carried out with each of the magnetic field modulation recording and the light power modulation recording. The same magneto-optical recording medium as produced in Example 1 was used, and the reading out conditions were the same as those in Example 1.

Figure 6:
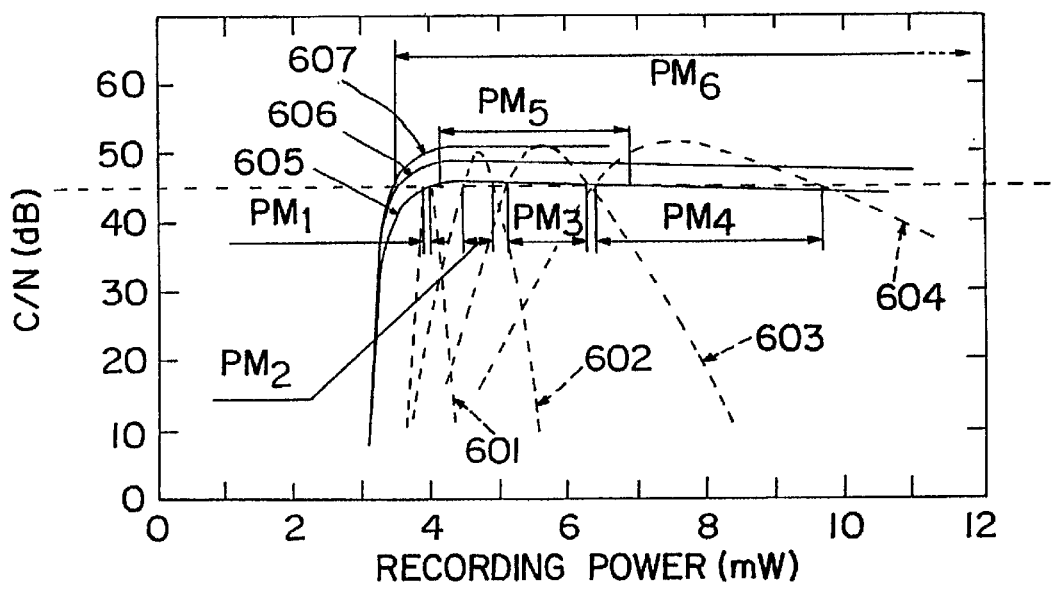
FIG. 6 is a graph showing dependency of the C/N on the recording power.

The results are shown in FIG. 6 as the dependency of the C/N on the recording power.

In FIG. 6, each of the curves 601 to 607 represents the results as follows:

| Recorded mark length (µm) | Magnetic field modulation recording | Light power modulation recording |
| --- | --- | --- |
| 0.4 | 605 | 601 |
| 0.5 | 606 | 602 |
| 0.6 | 607 | 603 |
| 0.7 |  | 604 |

As defined by the ISO Standard, the practically acceptable C/N is 45 dB. As seen from FIG. 6, when the recording power is suitably set, irrespective of the magnetic field modulation recording or the light power modulation recording, the C/N of 45 dB or higher is achieved at the recorded mark length of 0.4 µm or longer. These results confirm the possibility of the high density recording by the magneto-optical recording medium of the present invention.

In view of the defocus of the laser beam, a tilt of the recording medium from an axis of the laser beam, a setting error of the power and the like, a recording power margin for achieving the C/N of 45 dB or larger should be ±20% from the set value. Then, the recording power margins for achieving the C/N of 45 dB or larger ($PM_1$ to $PM_6$) are calculated from FIG. 6. The calculated values are as follows:

| Recorded mark length (µm) | Magnetic field modulation recording | Light power modulation recording |
| --- | --- | --- |
| 0.4 | $PM_5$ = ±25% | $PM_1$ = ±0.9% |
| 0.5 | $PM_6$ > ±50% | $PM_2$ = ±4.8% |
| 0.6 |  | $PM_3$ = ±10% |
| 0.7 |  | $PM_4$ = ±21% |

In the case of the light power modulation recording, to achieve the power margin of about ±20% from the set value, the recorded mark length should be at least 0.7 µm, so that the sufficient effect on the high recording density, which is one of the most important characteristics of the present invention, cannot be obtained.

In the case of the magnetic field modulation recording, the power margin of at least ±20% is obtained with the recorded mark length of 0.4 μm. This means that, the magneto-optical recording medium of the present invention can achieve the high recording density easily when the magnetic field modulation recording is used.

When the high recording density is sought in the case of the light power modulation recording, some special measures for realizing the recording and reading out at the small allowance of recording power should be employed, for example, before each recording, a level of the recording power is set by prelerning.

EXAMPLE 4

An example of the magneto-optical recording medium of the present invention will be explained by making reference to FIGS. 7A and 7B.

Figure 7A:
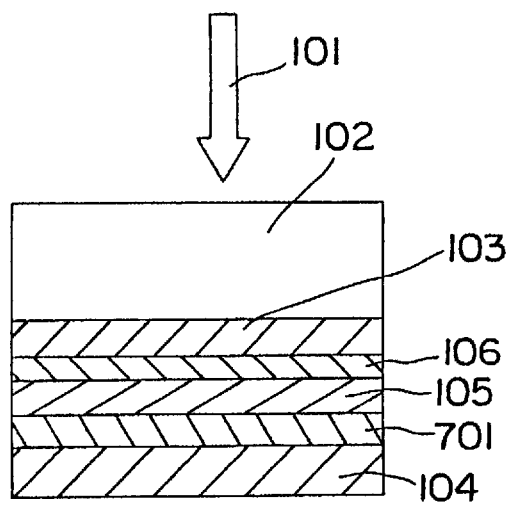
FIG. 7A is a cross sectional view of the magneto-optical recording medium of Example 4.
Figure 7B:
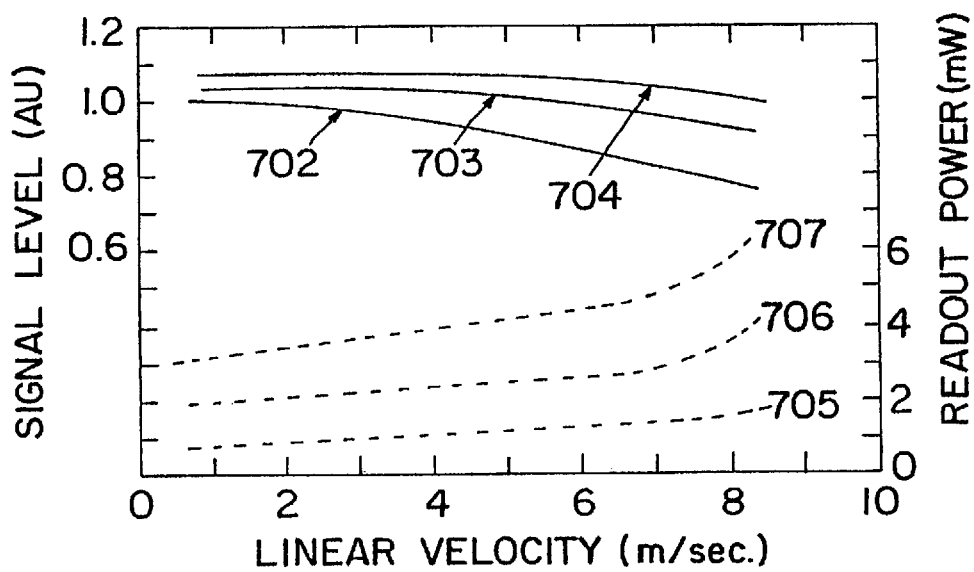
FIG. 7B is a graph showing dependency of the signal level and the readout power on the linear velocity.

FIG. 7A shows a cross sectional view of the magneto-optical recording medium of this Example, and FIG. 7B shows its characteristics.

The magneto-optical recording medium of this Example had substantially the same structure as that of Example 1 of FIG. 1A except that a thermal diffusion layer 701 is provided between the second magnetic film 105 and the protective layer 104. The thermal diffusion layer 701 was made of a thin aluminum film.

With this magneto-optical recording medium, recording-reading out characteristics were measured at various linear velocities. The results are shown in FIG. 7B, in which the solid lines represent the signal levels, and the dotted lines represent the optimum readout powers. 702 and 705 are for the case without the thermal diffusion film, 703 and 706 are for the case with the aluminum thermal diffusion film having a thickness of 50 nm, and 704 and 707 are for the case with the aluminum thermal diffusion film having a thickness of 100 nm.

The optimum readout power means a readout power at which a width of a copied region (in the track width direction) wherein the recorded mark is copied from the second magnetic film to the first magnetic film by the irradiation is 0.8 μm. The optimum readout power was defined as a readout power at which the cross talk between the adjacent tracks was −30 dB or lower when a recorded mark having a width of 0.8 μm was recorded at a track pitch of 0.8 μm.

In the measurement of the signal levels, in each structure, a signal deviation due to the readout power was corrected. Then, the dependency of the signal level on the linear velocity depends on the position and form of the copied area in relation to the region irradiated by the laser beam.

As seen from FIG. 7B, when no thermal diffusion layer 701 was provided, the signal decreased sharply as the linear velocity increased. This is because, when the linear velocity is low, the copied area is present substantially at the center of the region irradiated by the readout laser beam, while when the linear velocity is increased, the copied area shift to a rear portion of the irradiated region.

When the thermal diffusion layer 701 was provided, no or little decrease of the signal was found with the increase of the linear velocity. This is because the heat is diffused at substantially the same time as the laser beam irradiation, so that, even at the low linear velocity, the copied area 108 is present substantially at the center of the irradiated region.

As the thickness of the thermal diffusion layer 701 is increased, the readout power should be increased. In general, the recording power is 3 to 4 times the readout power and the maximum power to be applied to the magneto-optical recording medium is about 15 mW. Therefore, when the aluminum film is used as the thermal diffusion layer 701, its thickness is preferably not larger than 100 nm.

As understood from the above explanation, the provision of the thermal diffusion layer is an effective way to position the copied area near the center of the region irradiated by the readout laser beam.

When no thermal diffusion layer is provided, it is effective to use the magneto-optical recording medium at the linear velocity of 4 m/sec. or less.

Though the aluminum film was used as the thermal diffusion layer in this Example, any material having a larger thermal conductivity than the magneto-optical thin film can achieve the same effects. For example, Ag, Au or an alloy of Al containing Ti, Cr, etc. can be used. The thermal diffusion layer may be provided on the second magnetic film through a dielectric film having a thickness of 10 to 20 nm.

EXAMPLE 5

Figure 8:
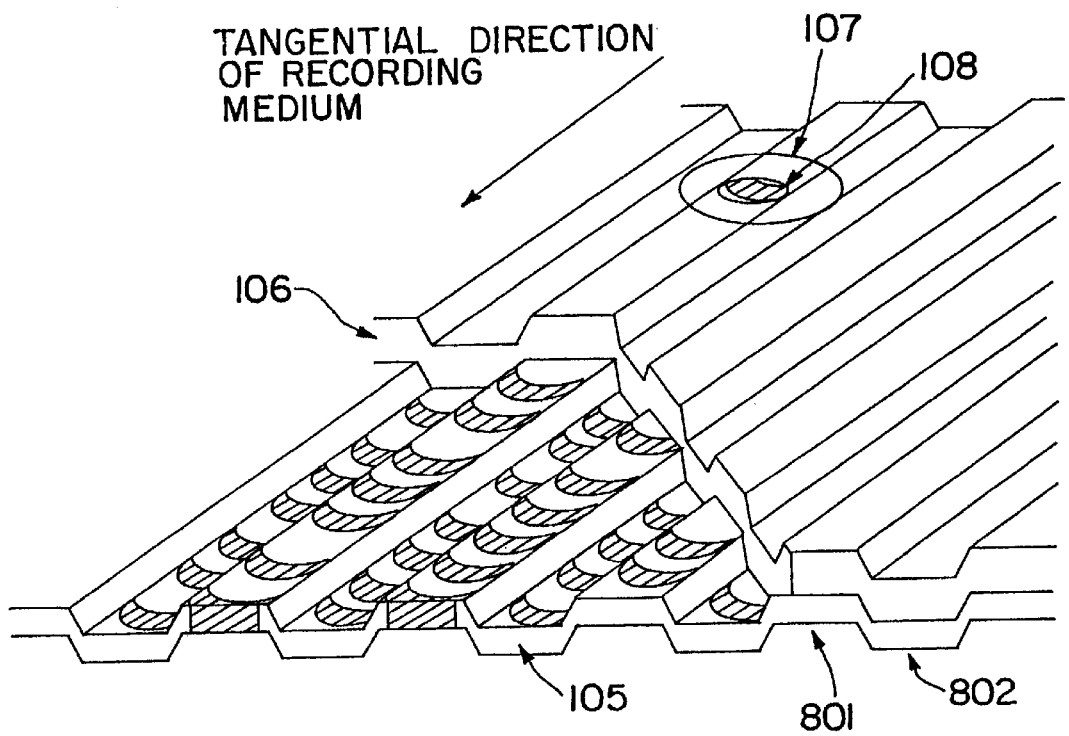
FIG. 8 is a partially cut-out perspective view of the magneto-optical recording medium of Example 5.

An example of the magneto-optical recording medium of the present invention will be explained by making reference to FIG. 8, which shows the structure of a magneto-optical recording disc having grooves as track guides in the readout step. In FIG. 8, 105 stands for the second magnetic film, 106 for the first magnetic film, 801 for a land part, 802 for a groove part, 107 for a region irradiated by the readout laser beam, and 108 for a copied area in which the magnetization of the second magnetic film is copied to the first magnetic film.

According to the present invention, since the copied area 108 is limited to a small area in comparison with the region 107 which is irradiated by the readout laser beam, not only the recording density in the tangential direction of the magneto-optical recording medium but also the recording density in a direction across the tracks can be increased. But, if the track pitch is decreased smaller than the diameter of the readout leaser beam spot by using only the land part or only the groove part as in the conventional magneto-optical recording medium, a tracking error signal abruptly decreases to that tracking servo is unstabilized. To overcome this problem, Japanese Patent Kokai Publication No. 138065/1982 proposes to record the signals both on the land part and the groove part so as to decrease the actual track pitch to a half without reducing the tracking error signal.

However, in the conventional reading out system, since the signals are picked up from the whole area of the region irradiated by the laser beam, the cross talk from the adjacent tracks increases if the track pitch is made smaller than the diameter of the laser beam spot. Therefore, no positive effect is obtained from the record of the signals on the groove part and the land part.

For example, when the laser beam of the readout optical system has a wavelength of 830 nm and NA is 0.55, the lower limit of the track pitch is 1.4 μm because of the influence of the cross talk from the adjacent tracks. Since a sufficient tracking error signal can be obtained by this 1.4 μm track pitch using this optical system even when the signals are recorded on the land part, it is not necessary to record the signals on both the groove part and the land part.

According to the present invention, since the copied area 108 is limited to a very small area in the region 107 irradiated by the readout laser beam, the amount of cross talk can be reduced to a very low level even with the track pitch of 0.8 μm.

According to the present invention, a lower limit of the track pitch is limited by the recording power margin rather than the amount of the cross talk. That is, when the data are recorded with an excess power, the data recorded on the adjacent track(s) are destroyed.

Figure 9:
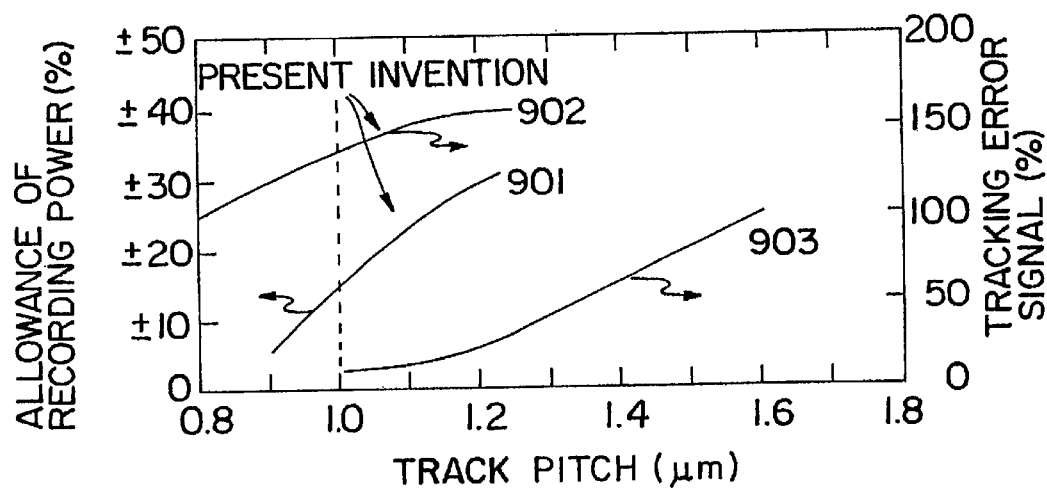
FIG. 9 is a graph showing dependency of allowance of the recording power and the tracking error signal on the track pitch.

FIG. 9 shows dependencies of the recording power margin and the tracking error signal on the track pitch in the magnetic field modulation recording according to the present invention.

For these measurements, a magneto-optical recording medium having the same structure as in Example 1 was used, and the linear velocity was 4 m/sec. In FIG. 9, 901 represents the recording power margin of the magneto-optical recording medium according to the present invention, 902 represents the tracking error signal when both the groove part and the land part are used as recording tracks, and 903 represents the tracking error signal when only the land part is used as the recording track.

As understood from the results shown in FIG. 9, the minimum track pitch which achieved the usable recording power margin of 15% by a simple learning was 1.0 $\mu$m. In comparison with the use of both the groove part and the land part as the recording tracks, when only the land part was used as the recording track, the tracking error signal decreased down to 8% or less so that the stable tracking servo could not be achieved.

Then, as shown in FIG. 8, the magneto-optical recording medium using both the groove part and the land part as the tracks with the track pitch of 1.0 $\mu$m was produced and the signals were recorded and read out. Thereby, the servo characteristics were stable, no cross talk was detected, and the magneto-optical recording medium could be satisfactorily used.

The track pitch of 1.0 $\mu$m may be the lower limit of the track pitch when the laser wavelength is 830 nm and the numerical aperture of the lens is 0.55. When other wavelength of the laser beam and/or other numerical aperture are used, the limit of the track pitch is proportional with ($\lambda$/NA). For example, when the wavelength $\lambda$ is 680 nm and the numerical aperture is 0.55, the limit of the track pitch is about 0.8 $\mu$m.

EXAMPLE 6

The magneto-optical recording medium of this Example will be explained by making reference to FIG. 10.

In FIG. 10, 1001 stands for an exclusive area for testing the set value of the readout power, and 1002 for a data area for recording data. In the readout power-testing area 1001, a standard signal is prerecorded and, at the head of the area, an identification code is stored for prohibiting recording by a user.

Two magneto-optical recording discs were used having such structure. Their layer structures were substantially the same as that of Example 1, except that one of them had a first magnetic film which was changed from the in-plane anisotropy magnetic film to the perpendicular anisotropy magnetic film at 80° C. (Disc A), while the other of them had a first magnetic film which was changed from the in-plane anisotropy magnetic film to the perpendicular anisotropy magnetic film at 140° C. (Disc B). This difference was realized by increasing the amount of Gd in the GdFeCo alloy by about 1.2%. The discs A and B had the same recording sensitivity.

On each of two discs, the signals were recorded by the magnetic field modulation recording with a 2/7 modulation signal so that the minimum recorded mark length was 0.5 $\mu$m and read out, and then a bite error rate was measured. The results are shown in FIG. 11.

Each of the magneto-optical recording discs used both the groove part and the land part as the recording tracks at the track pitch of 1.0 $\mu$m. The recording power was set at 4.5 mW so that the recorded mark width was 1.2 $\mu$m. The wording "recorded mark width was 1.2 $\mu$m" may not necessarily be a correct wording. More correctly, the recording power was the power when, on the recording disc having the track pitch of 1.0 $\mu$m, first the signals were recording on one track and next the signals were recorded on the two adjacent tracks at the same recording-power, the recorded mark on the firstly recorded track had the width of 0.8 $\mu$m on the observation with a microscope. This recording power means the upper limit of the allowance of the recording power. The results of FIG. 11 are the bite error rates of the firstly recorded tracks.

To correct the error with leaving a margin, the bite error rate is preferably $10^{-4}$ or less. To this end, as seen from FIG. 11, the readout power of the disc A should be from 1.0 to 1.1 mW, while that of the disc B should be from 1.9 to 2.2 mW. Since the allowable range of the readout powder for each of the discs is not wide enough, it is difficult to compensate the variability of the magneto-optical recording media by the single setting of the readout power, and it is preferable to optimize the readout power for each magneto-optical recording medium.

Then, there was provided a magneto-optical recording disc having the discrete exclusive areas 1001 for testing the readout power for setting the readout power from the center to the periphery as shown. This structure is effective when the disc is rotated at a constant angular velocity (CAV), because, due to the constant rotation speed, the linear velocity varies with the radius of the position where the data are read out. When the magneto-optical recording disc according to the present invention is used, the set value of the readout power depending on the linear velocity can be selected correctly by using the exclusive area 1001 for testing the readout power which is closest to the readout position.

Since a temperature in a reading out apparatus changes in use, the readout power substantially changes so that the number of errors during reading-out increase. In such case, at each temperature, the readout power can be reset using the exclusive area 1001 for testing the readout power which is closest to the readout position.

For setting the readout power using the exclusive area 1001 for testing the readout power, the errors are detected by increasing the readout power by the step of 0.1 mW from 0.8 mW, and the data are read out at the minimum power at which the number of the errors is sufficiently small. Alternatively, the errors are detected by increasing the readout power step by step, and then an intermediate power is set from the minimum power and the maximum power at which the number of the errors is sufficiently small.

Figure 12A:
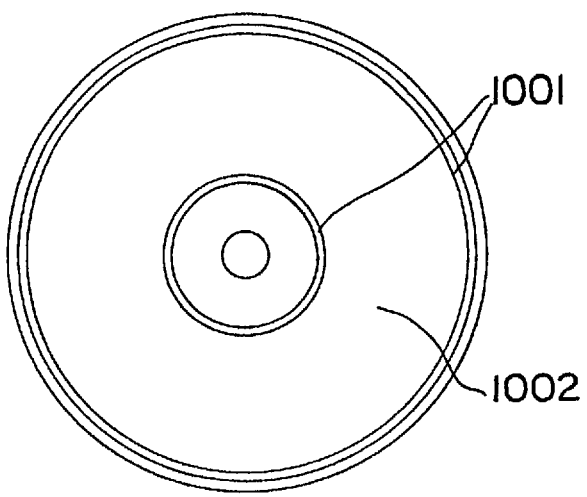
FIGS. 12A, 12B and 12C show plan views of some variations of the magneto-optical recording medium of Example 6, FIG. 13 schematically shows the recorded marks in Example 6.
Figure 12B:
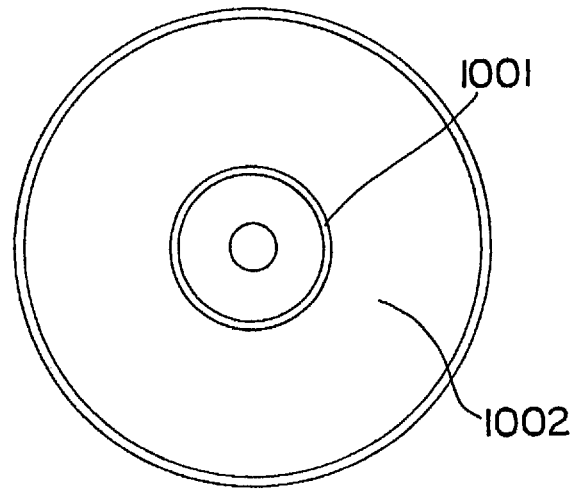
Figure 12C:
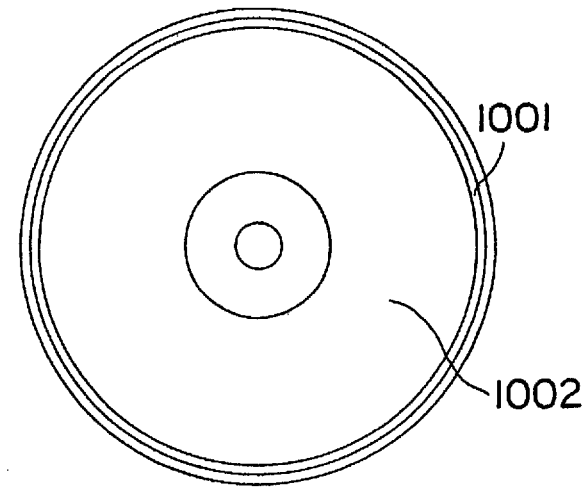

It is also effective to calculate the readout power between the exclusive areas 1001 for testing the readout power from the inner and outer exclusive areas 1001 adjacent to the track from which the data are being read out. In particular, in the case of a constant linear velocity (CLV), as shown in FIG. 12A, the exclusive areas 1001 for testing the readout power are set at the innermost part and the outermost part of the disc. Alternatively, as shown in FIG. 12B or FIG. 12C, the exclusive area 1001 for testing the readout power is set at the innermost part or the outermost part, respectively.

To assure the setting of the readout power, the signals to be recorded in the exclusive area 1001 for testing the readout power are preferably recorded in the worst state, and desirably by the recording power which is slightly higher than that for normal recording.

Figure 13:
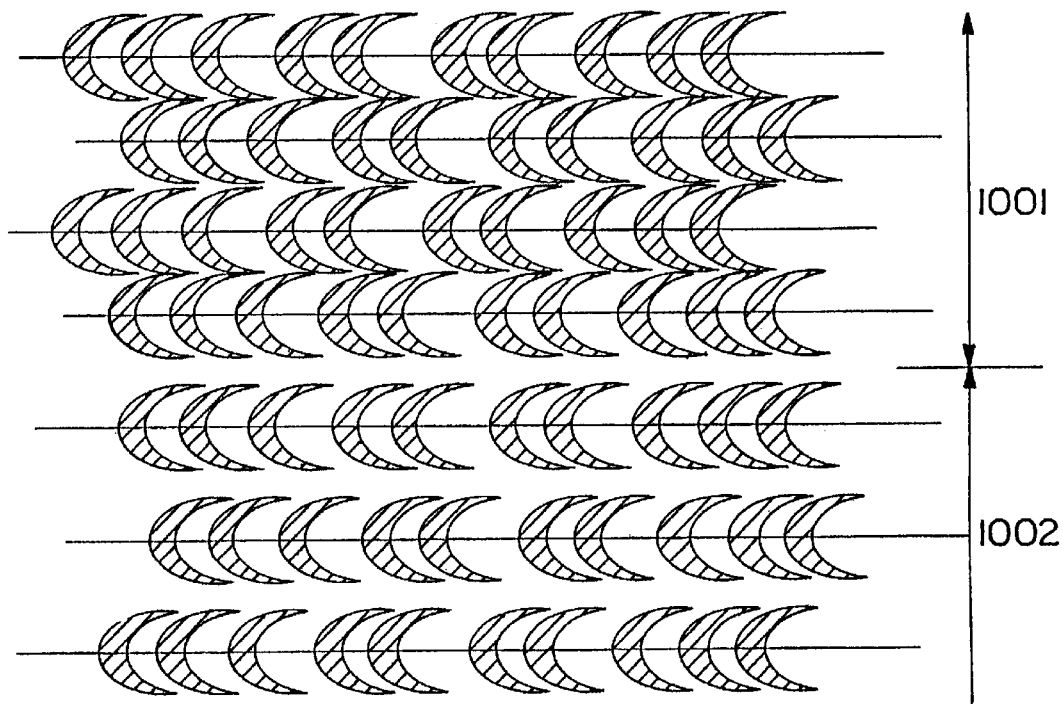

As shown in FIG. 13, the track pitch in the exclusive area 1001 for testing the readout power is preferably made slightly narrower than that in the date area 1002.

EXAMPLE 7

In this Example, magneto-optical recording media in which a switching temperature at which the first magnetic film changes from the in-plane anisotropy magnetic film to the perpendicular anisotropy magnetic film was different were produced with the same structure as in Example 1. To this end, an amount of Gd of the GdFeCo alloy was changed. Then, the properties of the various magneto-optical recording media having the different switching temperatures were measured.

When this switching temperature is too low, the magnetization in the second magnetic layer 105 is copied to the first magnetic film 106 at a much smaller readout power than a normally used readout power. As the result, with the normal readout power, the copied area becomes too large so that the satisfactory high density readout cannot be realized. That is, due to the increase of the cross talk, the error increases. This increase of the error becomes significant as the temperature increases.

Figure 14:
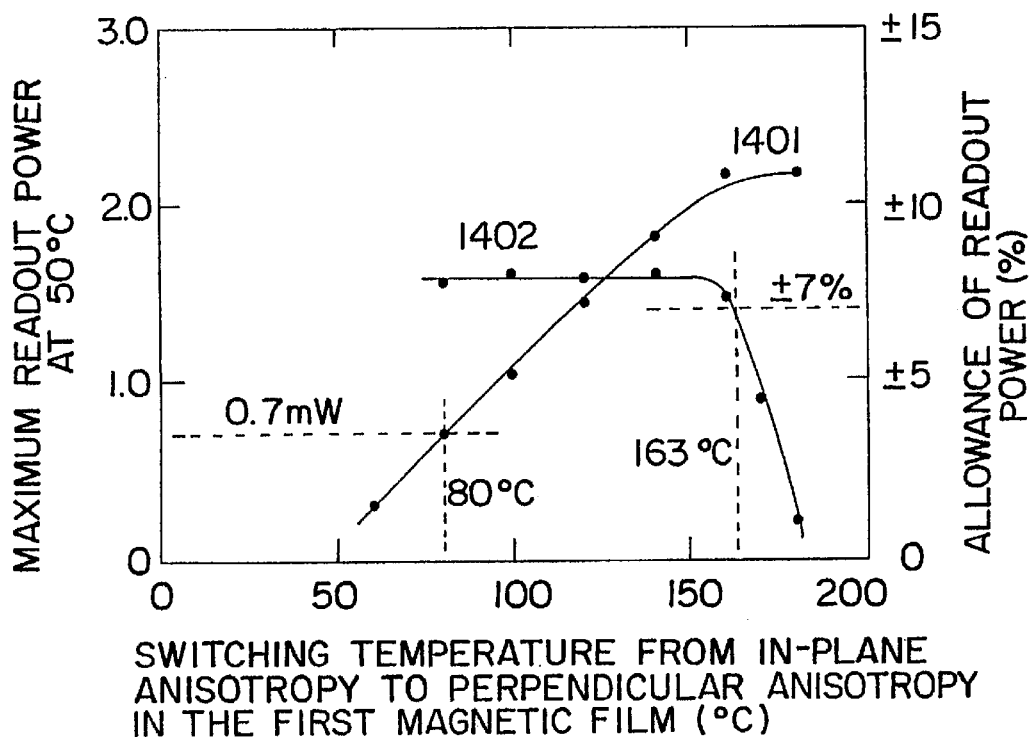
FIG. 14 is a graph showing dependency of the maximum readout power at 50° C. and the allowance of readout power on the switching temperature from in-plane anisotropy to perpendicular anisotropy in the first magnetic film in Example 7.

Therefore, the maximum readout power at which the error rate is $10^{-4}$ or less at 50° C. was measured. The results are shown in FIG. 14 as the curve 1401.

In order to readout both the servo and readout signals stably, the readout power of at least 0.7 mW is necessary. From FIG. 14, it is understood that, to achieve the readout power of at least 0.7 mW at 50° C., the switching temperature of the first magnetic film should be 80° C. or higher.

If the switching temperature at which the first magnetic film is changed from the in-plane anisotropy magnetic film to the perpendicular anisotropy magnetic film is excessively high, a difference between the switching temperature and the Curie temperature is small so that the data recorded in the second magnetic film are destroyed since the sufficient copied area is not maintained.

Then, the readout power with which the error was decreased to $10^{-4}$ or less without destroying the data recorded in the second magnetic film was measured. The results are shown in FIG. 14 as the curve 1402. The Curie temperatures of the second magnetic layers used in this Example were all 200° C.

By the way, the sufficient readout power margin is at least ±7% when the readout power testing of Example 7 is used. As seen from FIG. 14, to achieve the readout power margin of ±7%, the switching temperature of the first magnetic film should be 163° C. or lower. This temperature was obtained when the Curie temperature of the second magnetic film 105 was 200° C. When the Curie temperature of the second magnetic temperature is $Tc_1$, the switching temperature of the first magnetic film should be $0.8 \times Tc_1$ or lower.

In summary, the switching temperature at which the first magnetic film is changed from the in-plane anisotropy magnetic film to the perpendicular anisotropy magnetic film is preferably from 80° C. to $0.8 \times Tc_1$.

EXAMPLE 8

Figure 15A:
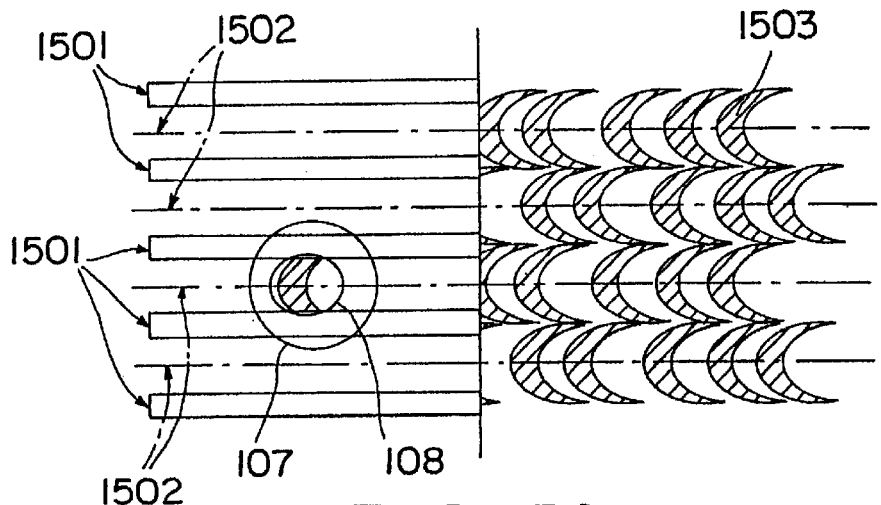
FIGS. 15A and 15B show a plan view and a cross sectional view of the magneto-optical recording medium of Example 8.
Figure 15B:
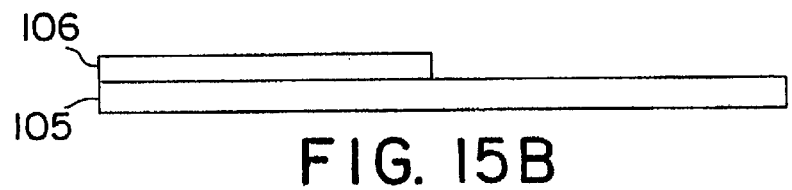

In this Example, a magneto-optical recording medium having a guard band between each pair of adjacent tracks was produced. FIGS. 15A and 15B show a cross sectional view and a plan view of this magneto-optical recording medium.

The structure of the magnetic films was the same as that in Example 1. That is, the second magnetic film 105 and the first magnetic film 106 were laminated. In FIG. 15, for clarity, the right half of the first magnetic film 106 is not shown, though the first magnetic film 106 covered the whole surface of the second magnetic film 105. In this structure, the recorded marks 1503 were stored in the second magnetic film.

In the magneto-optical recording medium of this Example, between each pair of the adjacent tracks, a guard band 1501 was provided.

When a laser beam stronger than the laser beam for recording is irradiated in a region between the tracks, the perpendicular anisotropy of the magnetic film is reduced so that the in-plane anisotropy magnetic film which is stable at any temperature is formed. Using this phenomenon, the guard band 1501 is formed by irradiating the region between each pair of the adjacent tracks with a condensed argon laser beam after the film formation. The guard band is formed only in the first magnetic film which inherently has a small perpendicular anisotropic energy, while the perpendicular magnetization is stored in the second magnetic film which inherently has a large perpendicular anisotropic energy after the formation of the guard band.

Since the guard band is in the state of the perpendicular anisotropy magnetic film at any temperature, a width of the track in the copied area 108 is limited so that only the signal from the center part can be picked up. Thereby, the cross talk caused by the increase of the read-out power is considerably decreased and the readout power margin is increased even when the data are recorded at a narrow track pitch.

In this Example, a width of the guard band was 0.3 μm.

Using the magneto-optical recording medium of this Example having the guard bands, the readout power margin was measured in the same manner as in Example 7. The readout power margin was ±20%. With a magneto-optical recording medium having no guard band, the readout power margin was ±8%. This means that the readout power margin of the magneto-optical recording medium of this Example is 2.5 times larger than that of the magneto-optical recording medium having In third band.

EXAMPLE 9

Figure 16A:
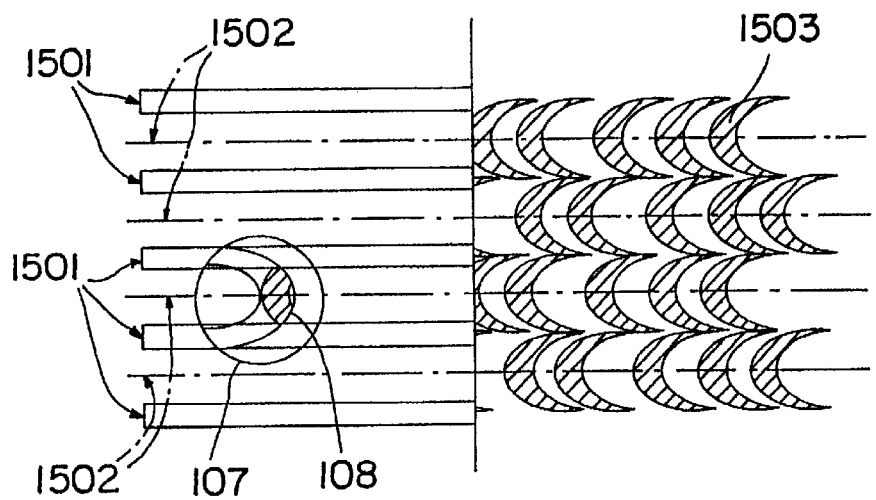
FIGS. 16A and 16B show a plan view and a cross sectional view of the magneto-optical recording medium of Example 9.
Figure 16B:
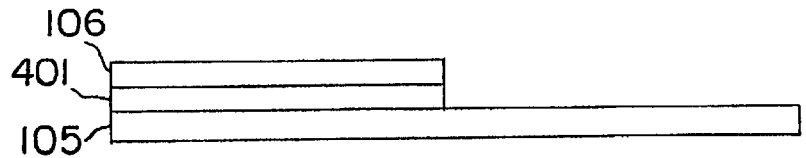

In this Example, the guard band was formed between each pair of the adjacent track of the magneto-optical recording medium which was produced in the same manner as in Example 2. The track pitch was 1.0 μm. The structure of this magneto-optical recording medium is shown in FIGS. 16A and 16B, which are a cross sectional view and a plan view, respectively. For clarity, the right halves of the first magnetic film 106 and the third magnetic film 401 are not shown. The recorded marks 1503 were stored in the second magnetic film 105.

In this structure, a guard band 1501 was formed between each pair of the adjacent track 1502. The guard band was formed by the same manner as in Example 8.

When the readout laser beam is irradiated on the region 107, the copied area is formed in the area 108.

Since the guard band is in the state of the perpendicular anisotropy magnetic film at any temperature, a width of the track in the copied area 108 is limited so that only the signal from the center part can be picked up. Thereby, the cross talk caused by the increase of the read-out power is considerably decreased and the readout power margin is increased even when the data are recorded at a narrow track pitch.

Using the magneto-optical recording medium of this Example having the guard bands, the readout power margin was measured in the same manner as in Example 7. The readout power margin was ±20%. With a magneto-optical recording medium having no guard band, the readout power margin was about 0% at the track pitch of 1.0 μm. These results confirm the great effect of the guard band on the increase of the readout power margin.

EXAMPLE 10

In this Example, a magneto-optical recording medium having the same structure as but a different coercive force of the second magnetic film from the magneto-optical recording medium of Example 2 was produced. The change of the coercive force was achieved by increasing or decreasing the amount of Tb in the alloy.

Figure 17:
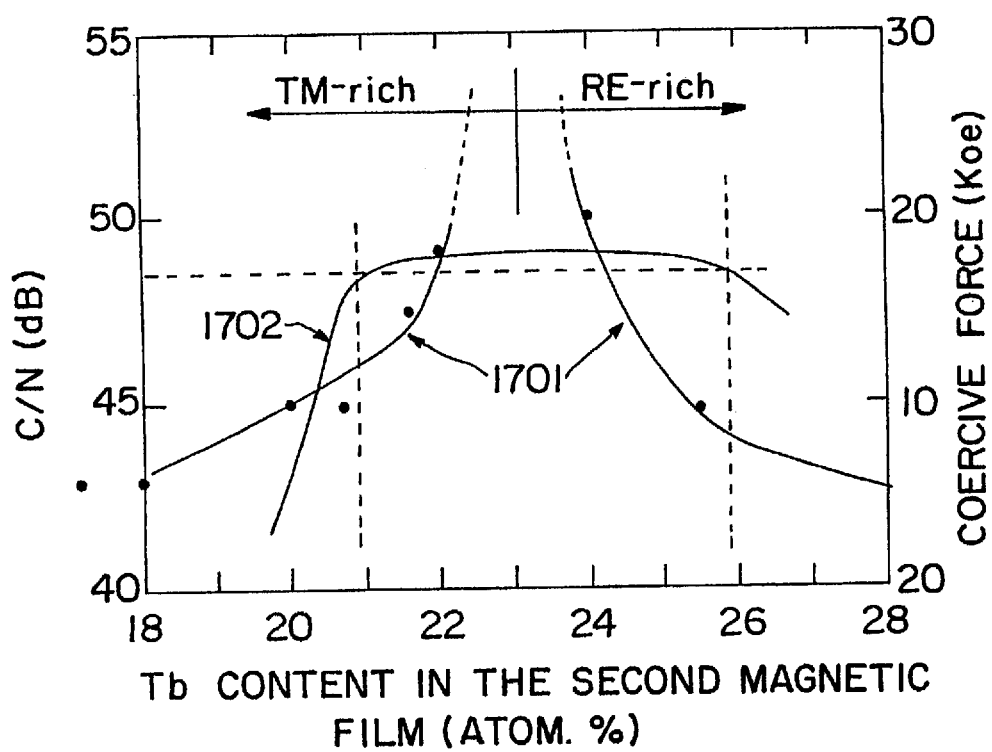
FIG. 17 is a graph showing dependency of the C/N and the coercive force on the Tb content in the second magnetic film in Example 10.

The coercive force of this alloy is shown in FIG. 17 as curves 1701, and the C/N after $10^6$ times continuous reads out is shown in FIG. 17 as a curve 1702. The readout conditions included 400 oe of the readout magnetic field and 2.0 mW of the readout power.

As understood from FIG. 17, when the readout is carried out with applying the readout magnetic field, the TbFeCo alloy of the second magnetic film should contain 21 to 26 atomic % of Tb. In terms of the coercive force, it is at least 12 Koe when the transition metal magnetization is rich, while it is at least 8 Koe when the rare earth metal magnetization is rich.

When no readout magnetic field is applied as in Example 1, the coercive force can be at least 7 Koe in the case of the composition which is rich in the rare earth metal magnetization.

Some possible variations of the magneto-optical recording media of above Examples will be explained.

The magneto-optical recording medium of Example 1 comprises the first and second magnetic films, and the first magnetic film has two functions, namely (1) A switching function against the temperature change, that is, change from the in-plane anisotropy magnetic film at room temperature to the perpendicular anisotropy magnetic film at the elevated temperature, and
(2) A readout function for providing the readout signal with the readout laser beam.

Figure 18A:
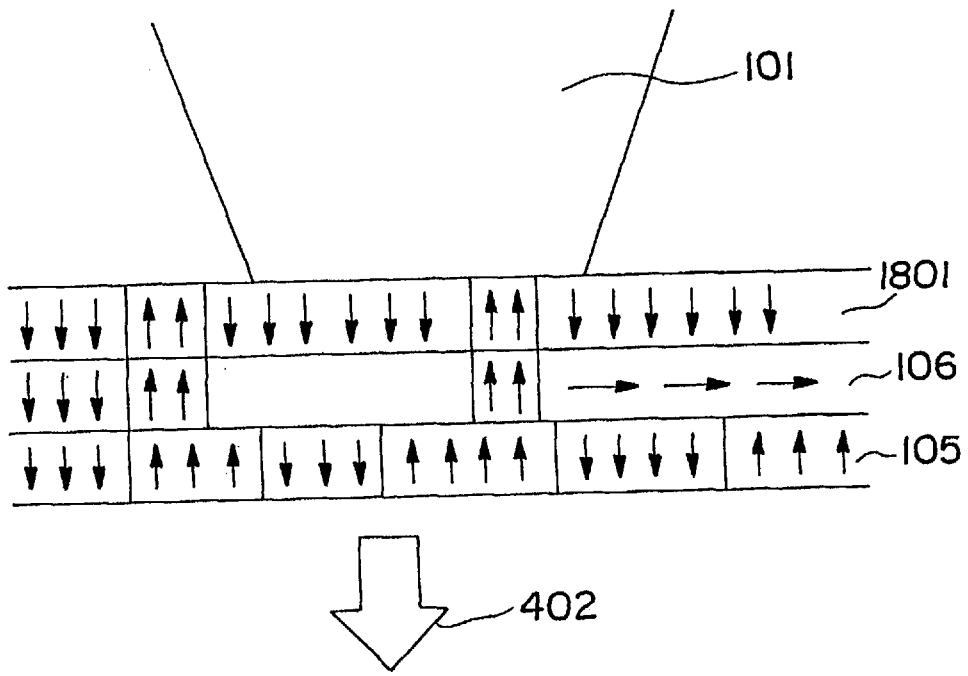
FIGS. 18A, 18B, 19A and 19B show the cross sectional views of the further embodiments of magneto-optical recording media of the present invention, and FIG. 20 are graphs showing dependency of the saturation magnetization and coercive force on the rare-earth metal content in the RE—TM alloy.
Figure 18B:
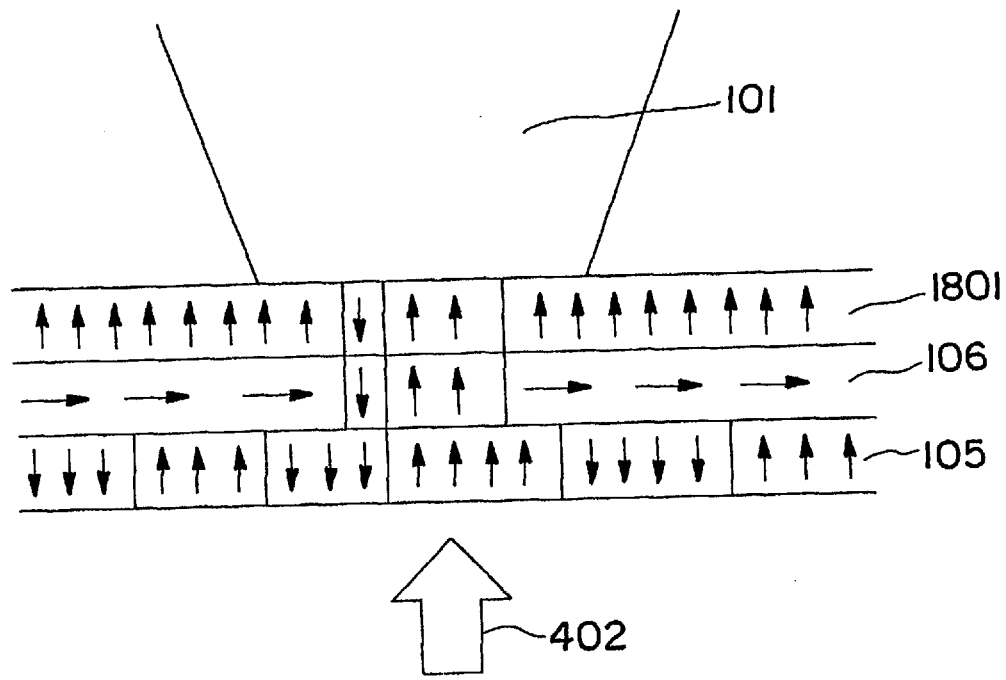

According to the present invention, these two functions may be possessed by two different magnetic films. In such case, the magneto-optical recording medium has a fourth magnetic film 1801 on the laser beam incident side in addition to the second magnetic film 105 and the first magnetic film 106 as shown in FIG. 18B. In such structure, the second magnetic film may have small Rθk,, while the fourth magnetic film 1801 preferably has large Rθk and a small coercive force to obtain a large readout signal. This is because the magnetization is orientated in one direction using means for applying a small magnetic field 402 which is used for recording and erasing the signals.

Preferred examples of the magnetic material which satisfies the above requirements are GdFe, GdCo, garnet type and MnBi type.

In order to make it easy to control the exchange coupled force, it is possible to provide a film for controlling the exchange coupled force between the first magnetic film 106 and the second magnetic film 105 of the magneto-optical recording medium of Example 1. Preferably, the film for controlling the exchange coupled force is formed from a rare earth metal/transition metal alloy having such composition that it is in the in-plane anisotropy magnetic film state from room temperature to the Curie temperature and has a thickness of 10 nm or less.

In Example 2, the second magnetic film was formed from the conventional magneto-optical film and stored the recorded informations. The first and third magnetic films had the following functions:

(1) A readout function for providing the readout signal with the readout laser beam,
(2) A switching function against the temperature change, that is, change from the in-plane anisotropy magnetic film at room temperature to the perpendicular anisotropy magnetic film at the elevated temperature, and
(3) A cut-off function for breaking the exchange coupling force by the area which is irradiated with the laser beam and heated to a high temperature.

In Example 2, one magnetic film has the functions (1) and (2) and another magnetic film has the function (3). In some cases, one magnetic film has the functions (2) and (3) and another magnetic film has the function (1). Such structure is shown in FIG. 18A. This structure is obtained by changing the Curie temperature of the first magnetic film 106 of the structure of FIG. 18B to 150° C. Such change of the Curie temperature is achieved by changing the alloy composition from $Gd_{26}Fe_{38}Co_{36}$ to $Dy_{29}Fe_{53}Co_{18}$. Thereby, the magnetic film has the Curie temperature of 150° C. and is the in-plane anisotropy magnetic film at a temperature lower than 100° C., and the perpendicular anisotropy magnetic film at a temperature higher than 100° C. By laminating the first magnetic film 106 on the fourth magnetic film 1801 and then laminating the second magnetic film 105 on the first magnetic film 106, the recorded marks on the second magnetic film 105 is copied to the fourth magnetic film 1801 in an area in which the first magnetic film 106 is in the state of the perpendicular anisotropy magnetic film.

Though one magnetic film may have the functions (1) and (3), such structure is less preferred, because, when it is intended to realize the function (3) using the Curie temperature of the rare earth metal/transition metal alloy, the Curie temperature should be 160° C. or lower, but in such case, the Kerr rotation angle is decreased so that it is difficult to obtain the sufficient readout characteristics.

Figure 19A:
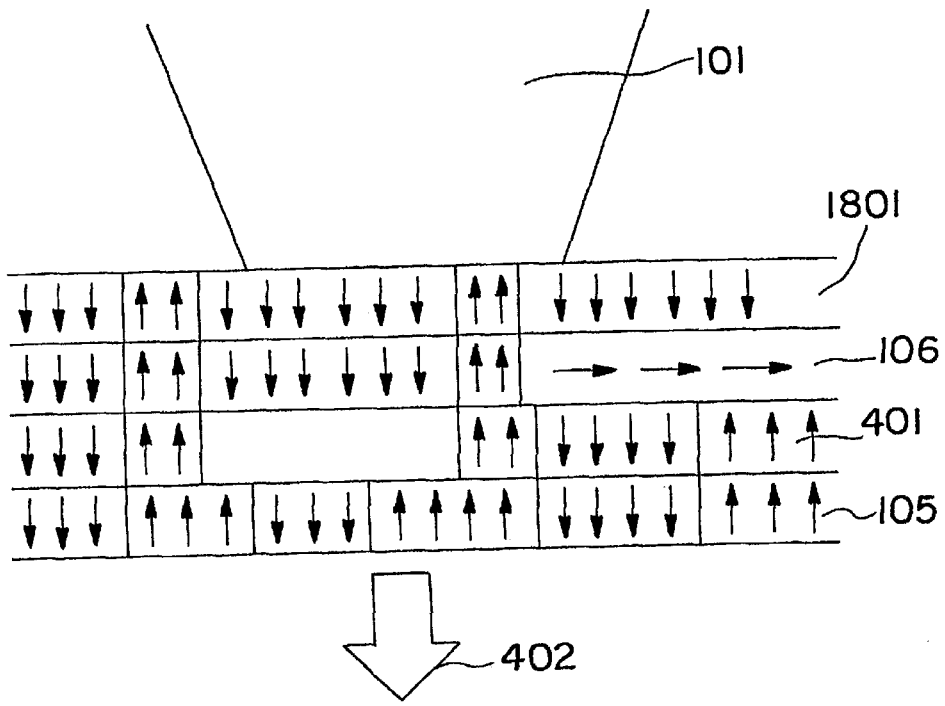
Figure 19B:
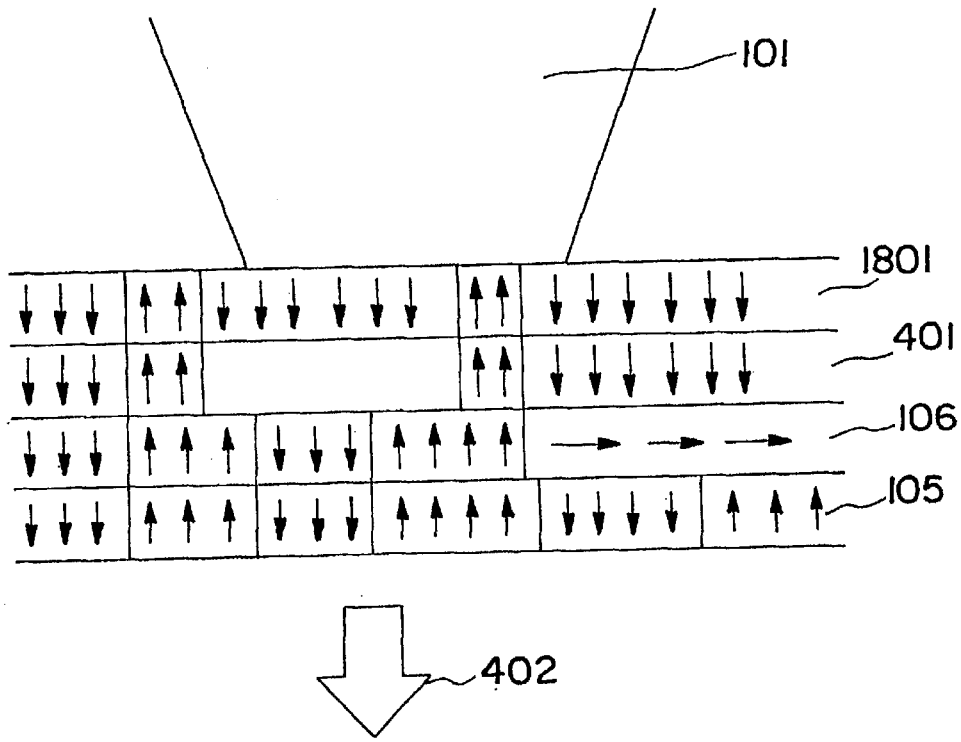

It is possible that each of three different magnetic films has each of the functions (1), (2) and (3). Such example is shown in FIG. 19. In this structure, the third magnetic film 1801 having the function (1) should on the laser beam incident side, while either one of first magnetic film 106 and the fourth magnetic film 1801 having the function (3) may be present on the laser beam incident side as shown in FIGS. 19A and 19B.

As explained above, an additional magnetic film having various functions may be provided in the magneto-optical recording medium of the present invention.

What is claimed is:

1. A magneto-optical recording medium comprising
   a recording layer which comprises a first magnetic film, a third magnetic film and a second magnetic film in this order from a laser beam incident side, wherein
   said second magnetic film has a perpendicular anisotropy in a temperature range from room temperature to a Curie temperature, and stores recorded data,
   said first magnetic film has an in-plane anisotropy at room temperature or a perpendicular anisotropy when the temperature is raised by the irradiation of a readout laser beam,
   said third magnetic film has a Curie temperature which is lower than the Curie temperatures of said first and second magnetic films.

2. The magneto-optical recording medium according to claim 1, wherein a temperature $Tc_2$ at which the anisotropy of the first magnetic film is changed from in-plane to perpendicular is from 80° C. to $0.8 \times Tc_1$ in which $Tc_1$ is the Curie temperature of the second magnetic film, and the exchange coupled force is present between said first magnetic film and said second magnetic film at a temperature not lower than $Tc_2$.

3. The magneto-optical recording medium according to claim 1, which further comprises a thermal diffusion layer.

4. The magneto-optical recording medium according to claim 1, which is read out at a linear velocity of 4 m/sec. or lower.

5. The magneto-optical recording medium according to claim 1, which further comprises a testing region for setting a readout power.

6. The magneto-optical recording medium according to claim 1, which has track guide grooves wherein grooves and lands are both used as recording tracks.

7. The magneto-optical recording medium according to claim 1, which further comprises a guard band between each pair of adjacent recording tracks in said first magnetic film, said first magnetic film in said recording track has an in-plane anisotropy at room temperature or has a perpendicular anisotropy when the temperature is raised by the irradiation of the readout laser beam, and said first magnetic film in said guard band has an in-plane anisotropy at any temperature.

8. The magneto-optical recording medium according to claim 1, wherein said second magnetic film is made of a TbFeCo alloy containing 21 to 26% of Tb.

9. The magneto-optical recording medium according to claim 1, wherein said second magnetic film is made of a TbFeCo alloy and has a coercive force of at least 12 KOe in a case where the content of Tb is less than 23 at % or at least 8 KOe in a case where the content of Tb is more than 24 at %.

* * * * *